(12) United States Patent
Clements et al.

(10) Patent No.: US 7,293,054 B2
(45) Date of Patent: Nov. 6, 2007

(54) RANDOM NUMBER SOURCE AND ASSOCIATED METHODS

(75) Inventors: Robert Paul Clements, Victor, NY (US); Michael Thomas Kurdziel, Rochester, NY (US)

(73) Assignee: Harris Corporation, Melbourne, FL (US)

(*) Notice: Subject to any disclaimer, the term of this patent is extended or adjusted under 35 U.S.C. 154(b) by 768 days.

(21) Appl. No.: 10/798,808

(22) Filed: Mar. 11, 2004

(65) Prior Publication Data
US 2005/0203979 A1   Sep. 15, 2005

(51) Int. Cl.
    G06F 7/58        (2006.01)
(52) U.S. Cl. .................................... 708/252
(58) Field of Classification Search .............. 708/252
    See application file for complete search history.

(56) References Cited

U.S. PATENT DOCUMENTS

| | | | |
|---|---|---|---|
| 4,905,176 A | 2/1990 | Schulz | 364/717 |
| 5,781,458 A | 7/1998 | Gilley | 364/717.06 |
| 6,240,432 B1* | 5/2001 | Chuang et al. | 708/252 |
| 6,480,072 B1* | 11/2002 | Walsh et al. | 331/78 |
| 6,807,553 B2* | 10/2004 | Oerlemans | 708/252 |
| 2002/0156819 A1 | 10/2002 | Oerlemans | 708/252 |
| 2002/0186086 A1* | 12/2002 | Curiger et al. | 331/78 |
| 2004/0193664 A1* | 9/2004 | Shimasaki | 708/252 |

* cited by examiner

Primary Examiner—D. H. Malzahn
(74) Attorney, Agent, or Firm—Allen, Dyer, Doppelt, Milbrath & Gilchrist, P.A.

(57) ABSTRACT

A random number source includes a ring oscillator generating an internal clock signal having random phase noise, and a first linear feedback shift register connected to the ring oscillator. A counter is connected to a first tap of the first linear feedback shift register for generating a count signal. A feedback bit controller is connected to a second tap of the first linear feedback shift register for generating a random feedback bit for a time based upon the count signal. A second linear feedback shift register is connected to the feedback bit controller for generating a random number based upon the random feedback bit.

38 Claims, 3 Drawing Sheets

RANDOM NUMBER SOURCE AND ASSOCIATED METHODS

GOVERNMENT LICENSE RIGHTS

The U.S. Government has a paid-up license in this invention and the right in limited circumstances to require the patent owner to license others on reasonable terms as provided for by the terms of contract No. MDA904-99-C-6511, awarded by the U.S. Government.

FIELD OF THE INVENTION

The present invention relates to the generation of random numbers, and more particularly, to a random number source and associated methods for generating a random number.

BACKGROUND OF THE INVENTION

In cryptography, true random numbers are used for generating encryption keys for encrypting information. Encryption keys should not be easily revealed to prevent the encrypted information from being decrypted by an unauthorized user. To reduce the risk of revealing encryption keys and thus circumventing the cryptographic application, true random numbers are used for generating such keys.

True random numbers for cryptographic applications are based on a true random process that is completely non-deterministic. This usually necessitates a hardware implementation instead of a software pseudo random implementation.

Generally, cryptographic quality random number sources include an array of ring oscillators for generating a true random number. The random phase jitter between the outputs of each ring oscillator is captured as entropy to produce a stream of random binary digits.

Portable military communication equipment, such as backpack radios, are battery operated and include cryptographic quality random number sources to provide high quality security. There is a requirement that this type of equipment consumes low power.

Unfortunately, ring oscillators draw large amounts of power, especially in high rate CMOS applications. For example, U.S. Patent application No. 2002/0156819 to Oerlmans discloses a true random number generator circuit comprising a plurality of ring oscillators connected to a linear feedback shift register. An output of the linear feedback shift register provides a random number.

SUMMARY OF THE INVENTION

In view of the foregoing background, an object of the present invention is to provide a random number source that consumes low power when generating random numbers.

This and other objects, advantages and features in accordance with the present invention are provided by a random number source comprising a ring oscillator generating an internal clock signal having random phase noise, and a first linear feedback shift register connected to the ring oscillator. A counter may be connected to at least one first tap of the first linear feedback shift register for generating a count signal. A feedback bit controller may be connected to a second tap of the first linear feedback shift register for generating a random feedback bit for a time based upon the count signal. The random number source may further comprise a second linear feedback shift register connected to the feedback bit controller for generating a random number based upon the random feedback bit.

The random number source in accordance with the present invention advantageously generates a true random number while consuming low power. In the prior art, a plurality of ring oscillators are used to generate the entropy or randomness of the random number. In sharp contrast, the ring oscillator in accordance with the present invention provides an internal clock signal having random noise. The first and second linear feedback shift registers accumulate the entropy or randomness for the random number being generated. Linear feedback shift registers consume less power than a plurality of ring oscillators.

The size of the first and second linear feedback shift registers may thus vary to trade off entropy versus power. In other words, larger size registers increase the entropy of the random output signal, but at the expense of more power. Smaller size registers decrease the entropy of the random output signal, but results in less power being consumed.

The random phase noise in the internal clock signal may be based upon a phase jitter between the internal clock signal and the system clock signal. The frequency of the internal clock signal is preferably greater than a frequency of the system clock signal, and the frequency of the internal clock signal may not be an integer multiple of the frequency of the system clock signal. This advantageously avoids the internal clock signal and the system clock signal from appearing to be coincidental with one another. The second linear feedback shift register may comprise a feedback path, and the random feedback bit may be input into this feedback path.

Another aspect of the present invention is directed to an encryption device comprising a random number source as defined above, and a cryptographic key generator is connected to the random number source for generating an output signal based upon the random umber.

Yet another aspect of the present invention is directed to an electronic device comprising a random number source as defined above. The electronic device may be a smart card or an electronic gaming device comprising other circuitry connected to the random number source for performing a desired operation based on the random number.

Another aspect of the present invention is directed to a method for generating a random number. The method may comprise generating an internal clock signal having random phase noise using a ring oscillator, and providing the internal clock signal to a first linear feedback shift register. A count signal may be generated using a counter connected to at least one first tap of the first linear feedback shift register. A random feedback bit may be generated for a time based upon the count signal using a feedback bit controller connected to a second tap of the first linear feedback shift register. The random number may be generated based upon the random feedback bit using a second linear feedback shift register connected to the feedback bit controller.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notations are used to indicate similar elements in alternative embodiments.

Figure 1:
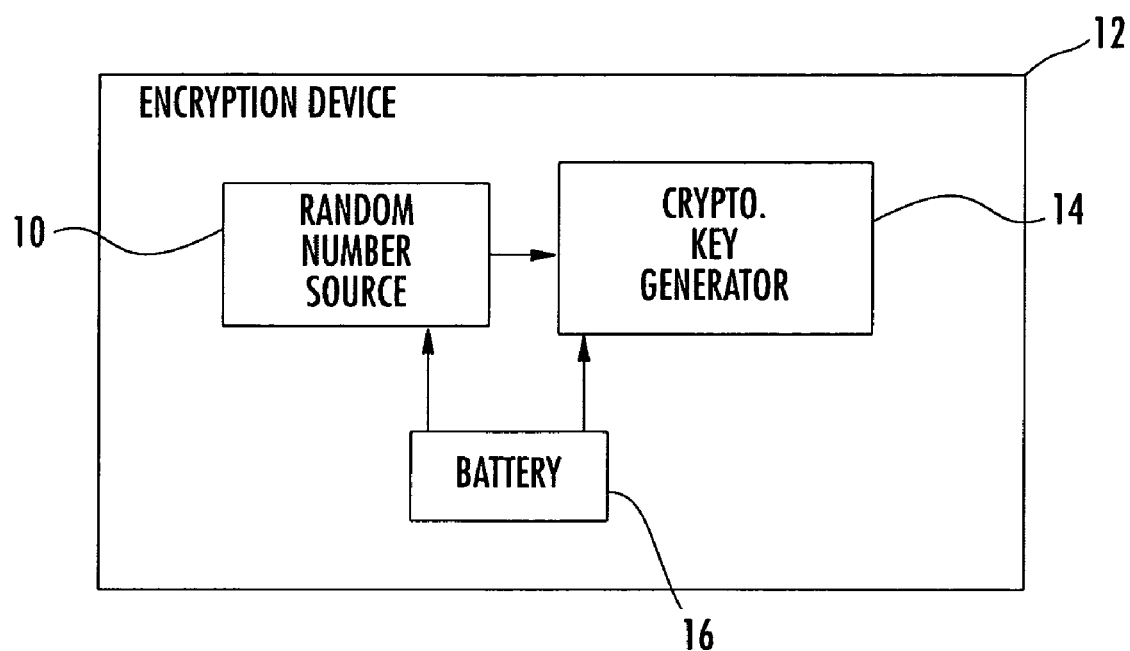
FIG. 1 is a block diagram of an encryption device comprising a random number source in accordance with the present invention.

A random number source 10 in accordance with the present invention will now be discussed. The random number source 10 may be used in a variety of applications requiring true random numbers. For example, an encryption device 12, as shown in FIG. 1, includes a random number source 10 providing random numbers to a cryptographic key generator 14. The cryptographic key generator 14 may generate random cryptographic keys, randomization vectors for an initial state of a cryptographic session or initialization vectors for the cryptographic session. A battery 16 powers the encryption device 12 and the cryptographic key generator 14.

Figure 2:
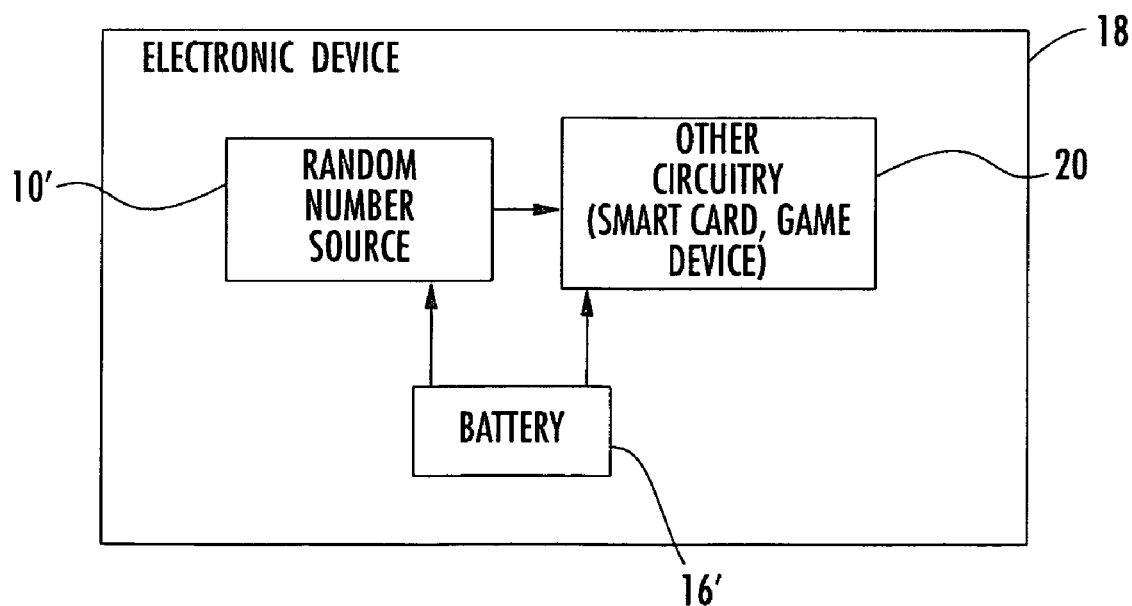
FIG. 2 is a block diagram of an electronic device comprising a random number source in accordance with the present invention.

Another example application of the random number source 10' is illustrated in FIG. 2, wherein an electronic device 18 includes the random number source 10' for providing random numbers to other circuitry 20 for performing a desired operation based on the random number. The electronic device 18 may be, for example, a smart card or an electronic gaming device that requires the generation of random numbers. The battery 16' also powers the random number source 10' and the other circuitry 20.

Figure 3:
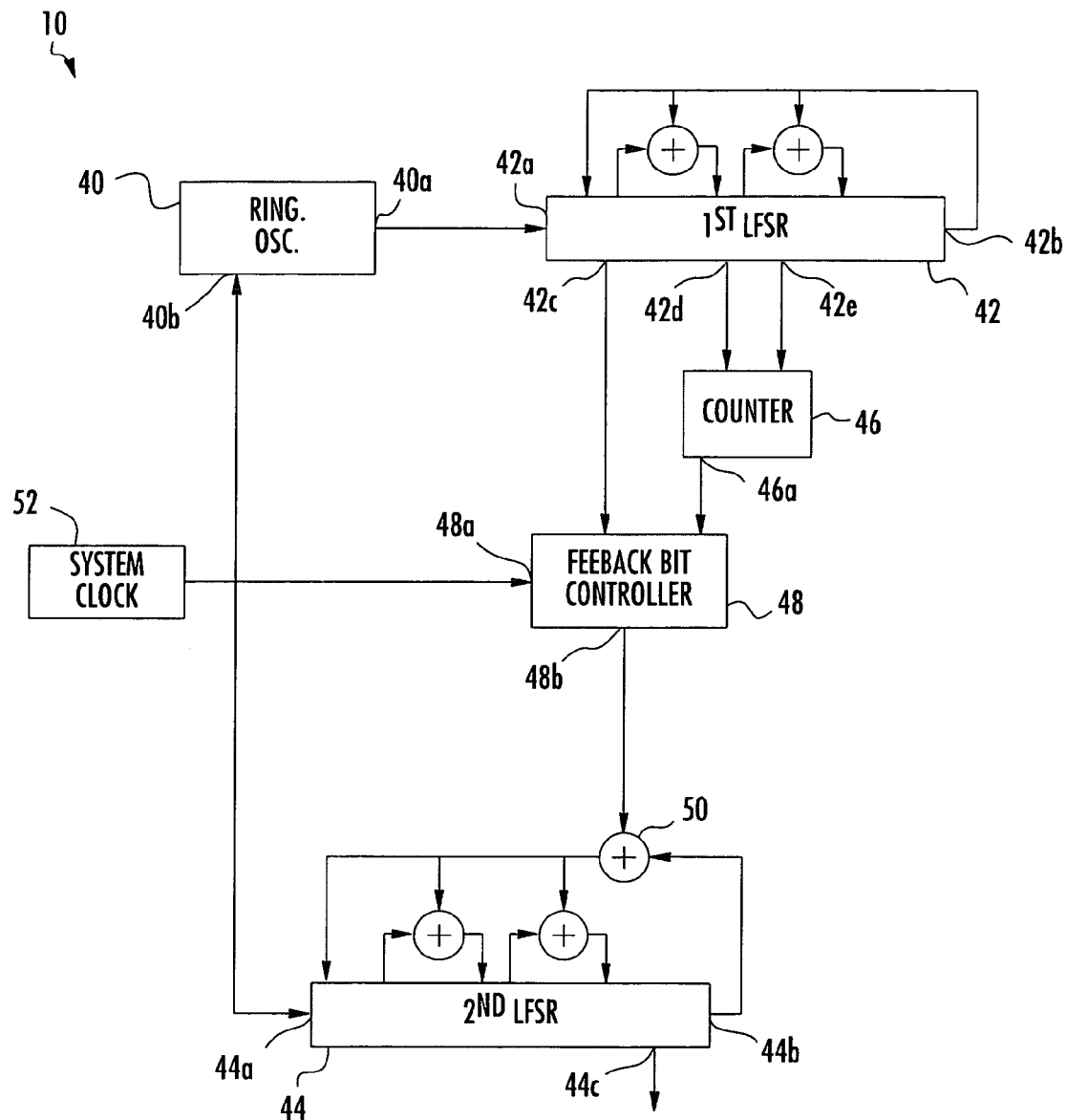
FIG. 3 is a detailed schematic diagram of the random number source as shown in FIGS. 1 and 2.

Referring now to FIG. 3, the random number source 10 as shown in FIGS. 1 and 2 will be discussed in greater detail. The random number source 10 comprises a ring oscillator 40 for generating an internal clock signal at output 40a. The ring oscillator 40 is formed by a plurality of cascade connected inverter circuits, as readily understood by those skilled in the art. The ring oscillator 40 is free running at a frequency set by a delay in the feedback of the oscillator design. The ring oscillator 40 receives at input 40b a system clock signal from system clock 52. The system clock 52 may be included with the random number source 10, or it may be external the random number source.

The random phase noise in the internal clock signal is based upon a phase jitter between the internal clock signal and the system clock signal. In addition, the frequency of the internal clock signal is preferably greater than a frequency of the system clock signal, and the frequency of the internal clock signal may not be an integer multiple of the frequency of the system clock signal. This advantageously avoids the internal clock signal and the system clock signal as appearing to be coincidental with one another.

A first linear feedback shift register (LFSR) 42 is connected to the ring oscillator 40, and is clocked by the internal clock signal at input 42a. The first LFSR 40 is designed using a primitive polynomial. The internal clock signal functions as a seed at startup for the first LFSR 42. As readily understood by those skilled in the art, the first LFSR 42 is made up of n shift registers that are serially connected. The shift registers may be D-type flip-flops, for example. An output 44b of one of the shift registers in the first LFSR 42 is feedback to the other shift registers. The variable n may be between 20 and 60 bits for example.

The first LFSR 42 further includes a plurality of taps 42c, 42d, 42e for outputting bits from selected shift registers. For instance, tap 42c provides a feedback bit that will be added to the feedback path of a second LFSR 44. Taps 42d, 42e provide respective bits to a counter 46.

The counter 46 generates a count signal at output 46a based upon the value of the bits received from taps 42d, 42e. The count signal is generated based upon a count cycle defined by the bits. For example, the count cycle starts when the bits received from taps 42d, 42e are 0,0 and the count cycle ends when the bits have cycled through 0,1; 1,0 to 1,1. The time associated with each count cycle is random. The pair of bits received by the counter 46 is for illustrative purposes. The actual number of bits may be equal to or greater than one as readily understood by those skilled in the art.

A feedback bit controller 48 receives the system clock signal at input 48a, is connected to the first LFSR 42 for receiving the feedback bit from tap 42c, and is connected to the counter 46 for receiving the count signal from output 46a. Output 48b of the feedback bit controller 48 provides the feedback bit to the feedback path of the second LFSR 44.

The feedback bit from the first LFSR 42 is latched into the feedback bit controller 48 when the system clock signal is received. The feedback bit is latched until the count signal is received from the counter 46. Even though the feedback bit controller is still receiving new feedback bits from the first LFSR 42 a new feedback bit is not latched until a new count signal is received.

The second LFSR 44 is clocked by the system clock signal at input 44a. As with the first LFSR 42, the second LFSR 44 is made up of m shift registers that are serially connected and is designed using a primitive polynomial. The variable m may be between 40 and 80 bits for example. The shift registers may also be D-type flip-flops, for example. An output of one of the shift registers in the second LFSR 44 is feedback to the other shift registers via output 44b. However, before this bit is feedback, it is combined with the feedback bit from the feedback bit controller 48 via an add circuit 50. The second LFSR 44 further includes at least one tap 44c for outputting the random number. In other words, after a large number of system clock cycles, such as 512 for example, m bits of real random data can be extracted from the second LFSR 44.

The random number source 10 in accordance with the present invention advantageously generates a true random number while consuming low power. In the prior art, a plurality of ring oscillators are used to generate the entropy or randomness of the random number. In the present invention, the ring oscillator 40 provides the internal clock signal having random phase noise, and the first and second LFSRs 42, 44 accumulate the randomness for the random number being generated. Linear feedback shift registers consume less power than a plurality of ring oscillators. In addition, the operating frequency of the ring oscillator 40 may be reduced to the minimum speed required to support the data rate of the random number source 10. This translates directly to lower power consumption.

The size of the first and second LFSRs 42, 44 may vary to trade off entropy versus power. In other words, larger size registers increase the entropy of the random output signal but at the expense of more power; whereas smaller size registers decrease the entropy of the random output signal but results in less power being consumed. For example, the first LFSR 40 may be a 41 bit register, whereas the second LFSR 44 may be a 67 bit register.

Figure 4:
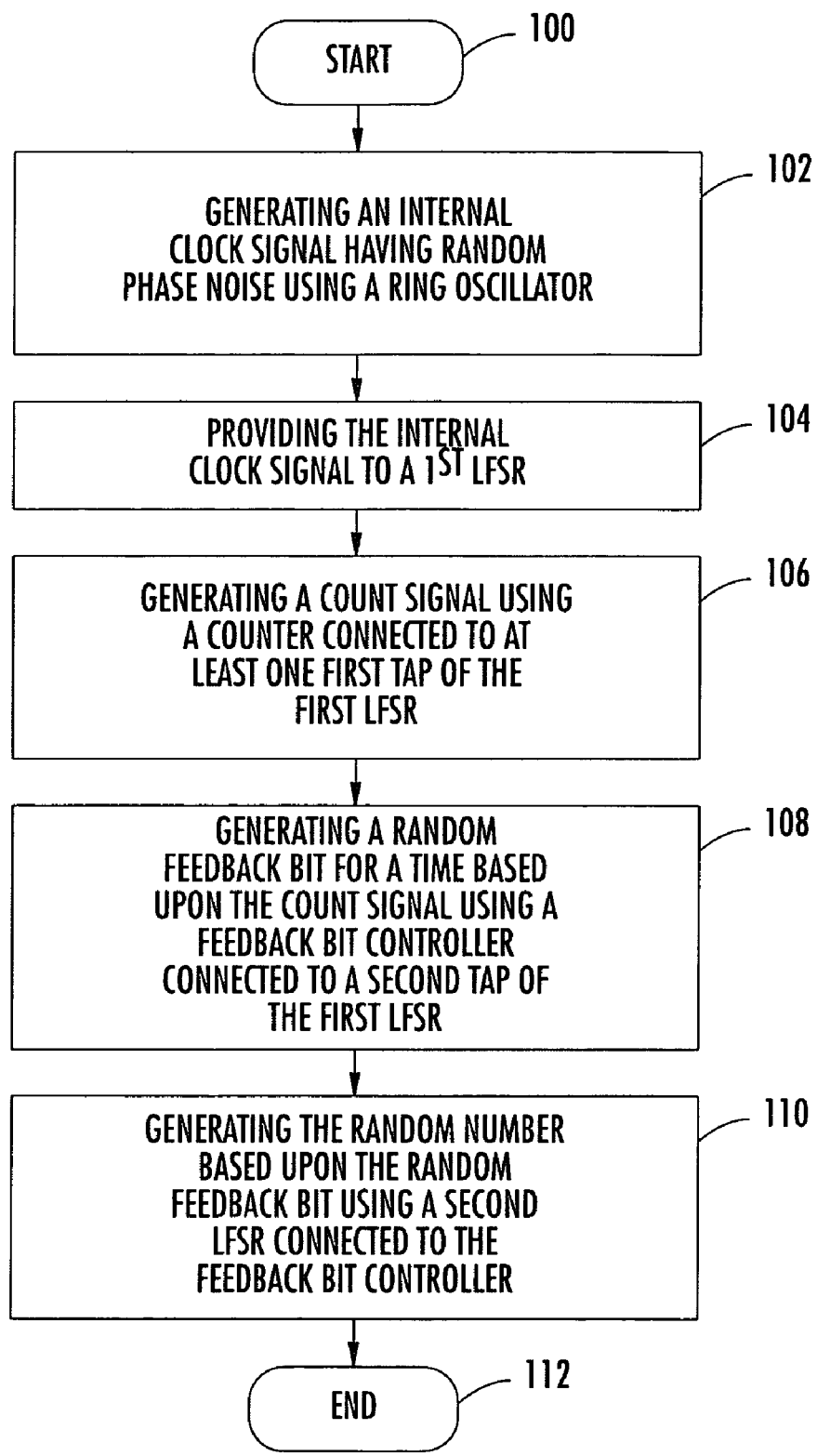
FIG. 4 is a flowchart illustrating a method for generating a random number in accordance with the present invention.

Another aspect of the present invention is directed to a method for generating a random number. Referring now to FIG. 4, from the start (Block 100), the method comprises generating an internal clock signal having random phase noise using a ring oscillator 40 at Block 102. The internal clock signal is provided to the first linear feedback shift register at Block 104. The count signal is generated at Block 106 using a counter 46 connected to at least one first tap 42d, 42e of the first linear feedback shift register 42. A random feedback bit is generated at Block 108 for a time based upon the count signal using a feedback bit controller 48 connected to a second tap of the first linear feedback shift register 42. The random number is generated at Block 110 based upon the random feedback bit using a second linear feedback shift register connected to the feedback bit controller 48. The method ends at Block 112.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A random number source comprising:
   a ring oscillator generating an internal clock signal having random phase noise;
   a first linear feedback shift register connected to said ring oscillator and comprising a plurality of taps;
   a counter connected to at least one first tap of said first linear feedback shift register for generating a count signal;
   a feedback bit controller connected to a second tap of said first linear feedback shift register for generating a random feedback bit for a time based upon the count signal; and
   a second linear feedback shift register connected to said feedback bit controller for generating a random number based upon the random feedback bit.

2. A random number source according to claim 1 further comprising a system clock connected to said ring oscillator, said feedback bit controller and said second linear feedback shift register.

3. A random number source according to claim 2 wherein a frequency of the internal clock signal is greater than a frequency of a system clock signal.

4. A random number source according to claim 2 wherein a frequency of the internal clock signal is not an integer multiple of a frequency of a system clock signal.

5. A random number source according to claim 1 wherein said second linear feedback shift register comprises a feedback path; and wherein said feedback bit controller is connected to the feedback path for inputting the random feedback bit into the feedback path.

6. A random number source according to claim 5 wherein said counter defines the time that the feedback bit is input into the feedback path based upon a count cycle of said counter.

7. A random number source according to claim 6 wherein the time is random for each count cycle.

8. A random number source according to claim 1 wherein said first linear feedback shift register comprises n bits, and said second linear feedback shift register comprises m bits, with n being between 20 and 60, and m being between 40 and 80.

9. An encryption device comprising:
   a random number source for generating a random number and comprising
      a ring oscillator generating an internal clock signal having random phase noise,
      a first linear feedback shift register connected to said ring oscillator and comprising a plurality of taps,
      a counter connected to at least one first tap of said first linear feedback shift register for generating a count signal,
      a feedback bit controller connected to a second tap of said first linear feedback shift register for generating a random feedback bit for a time based upon the count signal, and
      a second linear feedback shift register connected to said feedback bit controller for generating the random number based upon the random feedback bit; and
   a cryptographic key generator connected to said random number source and generating an output signal based upon the random umber.

10. An encryption device according to claim 9 wherein the output signal includes at least one of random cryptographic keys, randomization vectors for an initial state of a cryptographic session, and initialization vectors for a cryptographic session.

11. An encryption device according to claim 9 further comprising a system clock connected to said ring oscillator, said feedback bit controller and said second linear feedback shift register.

12. An encryption device according to claim 11 wherein a frequency of the internal clock signal is greater than a frequency of a system clock signal.

13. An encryption device according to claim 11 wherein a frequency of the internal clock signal is not an integer multiple of a frequency of a system clock signal.

14. An encryption device according to claim 9 wherein said second linear feedback shift register comprises a feedback path; and wherein said feedback bit controller is connected to the feedback path for inputting the random feedback bit into the feedback path.

15. An encryption device according to claim 14 wherein said counter defines the time that the feedback bit is input into the feedback path based upon a count cycle of said counter.

16. An encryption device according to claim 15 wherein the time is random for each count cycle.

17. An encryption device according to claim 9 wherein said first linear feedback shift register comprises n bits, and said second linear feedback shift register comprises m bits, with n being between 20 and 60, and m being between 40 and 80.

18. An encryption device according to claim 9 further comprising a portable housing containing said random number source and said cryptographic key generator.

19. An electronic device comprising:
   a random number source for generating a random number and comprising
      a ring oscillator generating an internal clock signal having random phase noise,
      a first linear feedback shift register connected to said ring oscillator and comprising a plurality of taps,
      a counter connected to at least one first tap of said first linear feedback shift register for generating a count signal, a feedback bit controller connected to a second tap of said first linear feedback shift register for generating a random feedback bit for a time based upon the count signal, and a second linear feedback shift register connected to said feedback bit controller for generating the random number based upon the random feedback bit; and other circuitry connected to said random number source for performing a desired operation based on the random number.

20. An electronic device according to claim 19 wherein the desired operation is a smart card operation.

21. An electronic device according to claim 19 wherein the desired operation is an electronic gaming operation.

22. An electronic device according to claim 19 further comprising a system clock connected to said ring oscillator, said feedback bit controller and said second linear feedback shift register.

23. An electronic device according to claim 22 wherein a frequency of the internal clock signal is greater than a frequency of a system clock signal.

24. An electronic device according to claim 22 wherein a frequency of the internal clock signal is not an integer multiple of a frequency of a system clock signal.

25. An electronic device according to claim 19 wherein said second linear feedback shift register comprises a feedback path; and wherein said feedback bit controller is connected to the feedback path for inputting the random feedback bit into the feedback path.

26. An electronic device according to claim 25 wherein said counter defines the time that the feedback bit is input into the feedback path based upon a count cycle of said counter.

27. An electronic device according to claim 26 wherein the time is random for each count cycle.

28. An electronic device according to claim 19 wherein said first linear feedback shift register comprises n bits, and said second linear feedback shift register comprises m bits, with n being between 20 and 60, and m being between 40 and 80.

29. An electronic device according to claim 19 further comprising a portable housing containing said random number source and said other circuitry.

30. A method for generating a random number comprising:

generating an internal clock signal having random phase noise using a ring oscillator;

providing the internal clock signal to a first linear feedback shift register;

generating a count signal using a counter connected to at least one first tap of the first linear feedback shift register;

generating a random feedback bit for a time based upon the count signal using a feedback bit controller connected to a second tap of the first linear feedback shift register; and generating the random number based upon the random feedback bit using a second linear feedback shift register connected to the feedback bit controller.

31. A method according to claim 30 further comprising using the random number in a cryptographic key generator.

32. A method according to claim 30 further comprising using the random number in a smart card.

33. A method according to claim 30 further comprising using the random number in an electronic gaming device.

34. A method according to claim 30 further comprising providing system clock signals to the ring oscillator, the feedback bit controller and the second linear feedback shift register.

35. A method according to claim 34 wherein a frequency of the internal clock signal is greater than a frequency of a system clock signal.

36. A method according to claim 34 wherein a frequency of the internal clock signal is not an integer multiple of a frequency of a system clock signal.

37. A method according to claim 30 wherein the second linear feedback shift register comprises a feedback path; and further comprising inputting the random feedback bit into the feedback path.

38. A method according to claim 37 wherein the counter defines the time that the feedback bit is input into the feedback path based upon a count cycle of the counter.

* * * * *

UNITED STATES PATENT AND TRADEMARK OFFICE
CERTIFICATE OF CORRECTION

PATENT NO. : 7,293,054 B2  Page 1 of 1
APPLICATION NO. : 10/798808
DATED : November 6, 2007
INVENTOR(S) : Clements et al.

It is certified that error appears in the above-identified patent and that said Letters Patent is hereby corrected as shown below:

Column 2, Line 35    Delete: "umber"
                     Insert: -- number --

Column 6, Line 21    Delete: "umber"
                     Insert: -- number --

Signed and Sealed this

Twenty-ninth Day of July, 2008

JON W. DUDAS
*Director of the United States Patent and Trademark Office*